(12) United States Patent
Tomeba et al.

(10) Patent No.: US 11,134,522 B2
(45) Date of Patent: Sep. 28, 2021

(54) RADIO COMMUNICATION APPARATUS AND TERMINAL APPARATUS

(71) Applicant: SHARP KABUSHIKI KAISHA, Sakai (JP)

(72) Inventors: Hiromichi Tomeba, Sakai (JP); Tomoki Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 151 days.

(21) Appl. No.: 16/068,282

(22) PCT Filed: Jan. 6, 2017

(86) PCT No.: PCT/JP2017/000219
§ 371 (c)(1),
(2) Date: Jul. 5, 2018

(87) PCT Pub. No.: WO2017/119470
PCT Pub. Date: Jul. 13, 2017

(65) Prior Publication Data
US 2019/0029041 A1 Jan. 24, 2019

(30) Foreign Application Priority Data
Jan. 8, 2016 (JP) .............................. JP2016-002357

(51) Int. Cl.
*H04W 74/00* (2009.01)
*H04W 74/08* (2009.01)
(Continued)

(52) U.S. Cl.
CPC ......... *H04W 74/085* (2013.01); *H04W 72/04* (2013.01); *H04W 74/0816* (2013.01); *H04W 84/12* (2013.01)

(58) Field of Classification Search
CPC .......... H04W 74/085; H04W 74/0816; H04W 72/04; H04W 84/12
See application file for complete search history.

(56) References Cited

U.S. PATENT DOCUMENTS

| 2015/0181620 | A1* | 6/2015 | Seok | .............. | H04W 74/0816 370/311 |
| 2016/0119810 | A1* | 4/2016 | Merlin | .............. | H04W 52/0216 370/311 |
| 2016/0345362 | A1* | 11/2016 | Lee | .............. | H04W 74/0816 |

FOREIGN PATENT DOCUMENTS

JP 2015-523802 A 8/2015

OTHER PUBLICATIONS

Wireless LAN Medium Access Control (MAC) and Physical Layer (PHY) Specifications, IEEE Std 802.11TM-2012, Mar. 2012.
(Continued)

*Primary Examiner* — Lakeram Jangbahadur
(74) *Attorney, Agent, or Firm* — ScienBiziP, P.C.

(57) ABSTRACT

A radio communication apparatus that is a transmission opportunity holder efficiently transmits an instruction of frame transmission, to multiple terminal apparatuses. A radio communication apparatus of the present invention includes a transmission unit configured to transmit a first frame to obtain a TXOP, transmit a Trigger frame providing an instruction of transmission of a second frame addressed to the radio communication apparatus itself, to at least one of the multiple terminal apparatuses in the TXOP, and transmit a third frame addressed to at least one of the multiple terminal apparatuses in the TXOP. A value indicating a TXOP that is written in the second frame and that the third frame is to obtain is different from a value obtained by dividing a value indicating the TXOP written in the first
(Continued)

frame by a value indicating a duration elapsed from start of transmission of the first frame to communication completion of the second frame.

5 Claims, 9 Drawing Sheets

(51) Int. Cl.
*H04W 72/04* (2009.01)
*H04W 84/12* (2009.01)

(56) References Cited

OTHER PUBLICATIONS

Koichi Ishihara, Simultaneous Transmission Technologies for HEW, IEEE 11-13/1395r2, Nov. 2013.
Geonjung Ko, et. al., Improving Spatial Reuse During OBSS UL MU Procedure,IEEE 802. 11-15/1338r1, Nov. 9, 2015.
Liwen Chu, et. al., 80MHz/160MHz Protection, IEEE 802.11-10/1096r7, Sep. 14, 2010.
Po-Kai Huang, et. al., NAV Consideration for UL MU Response Follow Up,IEEE 802.11-15/1326r2, Nov. 9, 2015.

\* cited by examiner

RADIO COMMUNICATION APPARATUS AND TERMINAL APPARATUS

TECHNICAL FIELD

The present invention relates to a radio communication apparatus and a terminal apparatus.

BACKGROUND ART

The Institute of Electrical and Electronics Engineers Inc. (IEEE) has developed IEEE 802.11 ac for enabling further speeding up of IEEE 802.11, which is a wireless Local Area Network (LAN) standard. In recent years, standardization activities of IEEE 802.11ax have been started to provide a successor standard of IEEE 802.11ac. With rapid advancement of wireless LAN devices, improvement of the throughput per user in environment overcrowded with wireless LAN devices has been discussed in IEEE 802.11ax standardization.

In the IEEE 802.11 standards, each terminal apparatus accesses a radio medium, based on Carrier sense multiple access/collision avoidance (CSMA/CA). The terminal apparatus can perform physical Carrier sense for determining that the radio medium is in a Busy state as long as the received power of a received frame does not fall below a prescribed threshold.

The wireless LAN device can configure a duration in which frame transmission is prohibited (Network allocation vector (NAV)), based on information associated with a frame length or a frame exchange period written in header information of the physical layer and MAC layer (information written in the Length field, information written in the Duration/ID field) in the received frame. In the duration in which the NAV is configured, the terminal apparatus determines that the radio medium is in a Busy state, and hence NAV configuration is also called virtual Carrier sense. Meanwhile, the wireless LAN device can transmit a frame in which a duration for communication of the device itself is written. Since another wireless LAN device that has received the frame configures the duration as the NAV, the wireless LAN device that has transmitted the frame can use the radio medium without restraint during the duration written in the frame. The duration in which the radio medium can be used without restraint is referred to as a Transmission opportunity (TXOP), and the wireless LAN device holding the TXOP is referred to as a TXOP holder.

A TXOP holder can provide an instruction of frame transmission to another wireless LAN device in the TXOP that the TXOP holder has obtained. For example, in the IEEE 802.11-2012 standard, Reverse direction protocol (RDP) is standardized as one of this scheme (refer to NPL 1).

Meanwhile, in the IEEE 802.11ax standard, implementation of Orthogonal frequency division multiple access (OFDMA) in addition to Multi-user multiple-input multiple-output (MU-MIMO), which has been standardized in the IEEE 802.11ac standard, has been discussed as a multi-access scheme, in which multiple wireless LAN devices transmit frames simultaneously (refer to NPL 2).

CITATION LIST

Non-Patent Documents

[NON-PATENT DOCUMENT 1] NPL 1: IEEE Std 802.11 TM-2012, March 2012.
[NON-PATENT DOCUMENT 2] NPL 2: IEEE 11-13/1395r2, November 2013.

DISCLOSURE OF THE INVENTION

Problems to be Solved by the Invention

In the known IEEE 802.11 standards, it is possible for a TXOP holder to provide an instruction of frame transmission to another terminal apparatus in the TXOP that the TXOP holder has obtained. However, in known schemes, a TXOP holder provides an instruction of frame transmission to each one terminal apparatus. For this reason, in a case that multi-access is employed in the IEEE 802.11ax standard, the TXOP holder is not capable of providing an instruction of frame transmission to multiple terminal apparatuses simultaneously.

The present invention has been made in view of the above problem, and an object of the present invention is to disclose a radio communication apparatus and a terminal apparatus that allow a radio communication apparatus being a transmission opportunity holder to efficiently transmit an instruction of frame transmission, to multiple terminal apparatuses in a communication system for transmitting frames to multiple terminal apparatuses simultaneously, with the assumption of Carrier sense.

Means for Solving the Problems

To address the above-mentioned problem, a radio communication apparatus and a terminal apparatus according to an aspect of the present invention are configured as follows.

(1) Specifically, a radio communication apparatus according to an aspect of the present invention is a radio communication apparatus configured to communicate with multiple terminal apparatuses, the radio communication apparatus including: a transmission unit configured to transmit a first frame to obtain a TXOP, transmit a Trigger frame providing an instruction of transmission of a second frame addressed to the radio communication apparatus itself, to at least one of the multiple terminal apparatuses in the TXOP, and transmit a third frame addressed to at least one of the multiple terminal apparatuses in the TXOP. A value indicating a TXOP that is written in the second frame and that the third frame is to obtain is different from a value obtained by dividing a value indicating the TXOP written in the first frame by a value indicating a duration elapsed from start of transmission of the first frame to communication completion of the second frame.

(2) A radio communication apparatus according to an aspect of the present invention is the radio communication apparatus according to (1) above, and the transmission unit transmits the third frame without performing Carrier sense, in a case that a value indicating a TXOP that is written in the third frame and that the third frame is to obtain is smaller than the value obtained by dividing the value indicating the TXOP written in the first frame by the value indicating the duration elapsed from the start of transmission of the first frame to the communication completion of the second frame.

(3) A radio communication apparatus according to an aspect of the present invention is the radio communication apparatus according to (1) above, and the transmission unit includes information indicating a TXOP that the second frame is to obtain, in the Trigger frame.

(4) A radio communication apparatus according to an aspect of the present invention is the radio communication apparatus according to (3) above, and a length of the TXOP that the second frame is to obtain is a duration indicated by the value obtained by dividing the value indicating the TXOP written in the first frame by the value indicating the duration elapsed from the start of transmission of the first frame to the communication completion of the second frame.

(5) A radio communication apparatus according to an aspect of the present invention is the radio communication apparatus according to (1) above, and the radio communication apparatus includes a reception unit configured to determine, in a case of not receiving the second frame for a prescribed duration from the transmission of the first frame from the transmission unit, that the obtaining of the TXOP has failed.

(6) A radio communication apparatus according to an aspect of the present invention is the radio communication apparatus according to (5) above, and, in a case that the reception unit determines that the obtaining of the TXOP has failed, the transmission unit transmits a frame indicating abandonment of the TXOP.

(7) A radio communication apparatus according to an aspect of the present invention is the radio communication apparatus according to (I) above, and the transmission unit transmits a frame indicating abandonment of the TXOP in a case that a value indicating a TXOP that is written in the third frame and that the third frame is to obtain is greater than the value obtained by dividing the value indicating the TXOP written in the first frame by the value indicating the duration elapsed from the start of transmission of the first frame to the communication completion of the second frame, and, after the transmission of the frame indicating the abandonment of the TXOP, performs Carrier sense.

(8) A terminal apparatus according to an aspect of the present invention is a terminal apparatus for communicating with a radio communication apparatus, the terminal apparatus including: a reception unit configured to receive a first frame to obtain a TXOP transmitted from the radio communication apparatus; and an autonomous distributed control unit configured to configure a NAV, based on information indicating a duration of the TXOP written in the first frame. The autonomous distributed control unit resets the NAV in a case of not receiving a frame including information indicating a BSS to which the radio communication apparatus belongs, for a prescribed duration after reception of the first frame.

(9) A terminal apparatus according to an aspect of the present invention is the terminal apparatus according to (8) above, and the reception unit includes a function of receiving a Trigger frame transmitted from the radio communication apparatus and providing an instruction of transmission of a frame addressed to the radio communication apparatus. The terminal apparatus includes a transmission unit configured to configure a NAV, based on information written in a frame transmitted from a BSS different from the BSS to which the radio communication apparatus belongs, and not to transmit the frame addressed to the radio communication apparatus in a case of receiving the Trigger frame in a duration of the configured NAV.

(10) A terminal apparatus according to an aspect of the present invention is the radio communication apparatus according to (8) above, and the reception unit receives a frame indicating abandonment of the TXOP transmitted from the radio communication apparatus. The terminal apparatus includes a transmission unit configured to transmit, after receiving the frame indicating the abandonment of the TXOP, a frame indicating transmission of the frame indicating the abandonment of the TXOP.

Effects of the Invention

According to an aspect of the present invention, the radio communication apparatus which is a Transmission opportunity holder can efficiently transmit an instruction of frame transmission, to multiple terminal apparatuses. Hence, the multiple terminal apparatuses can efficiently access a radio medium, and this consequently contributes to improvement of user throughput of wireless LAN devices.

MODE FOR CARRYING OUT THE INVENTION

Figure 1:
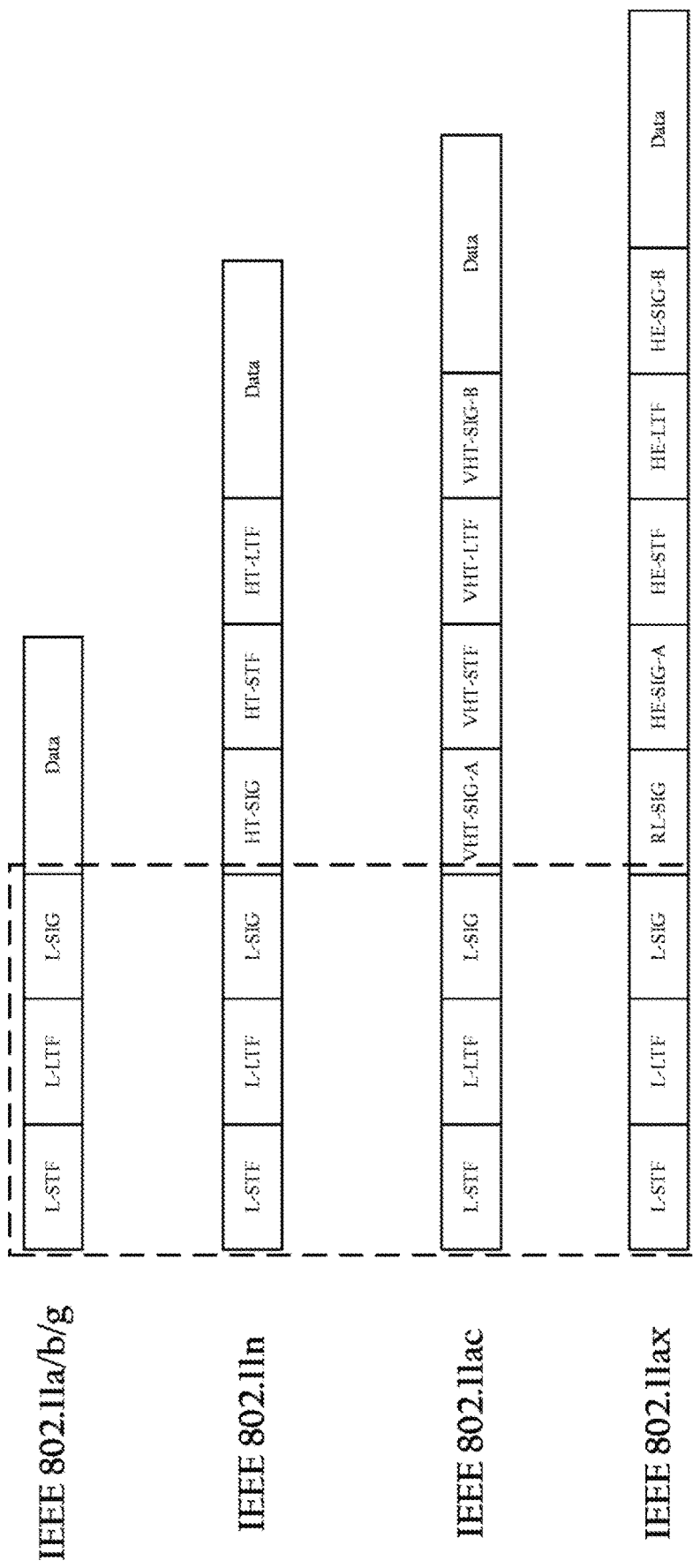
FIG. 1 is a diagram illustrating examples of frame structures according to an aspect of the present invention.

A communication system of a present embodiment includes a radio transmission apparatus (Access point, base station apparatus) and multiple radio reception apparatuses (stations, terminal apparatuses). A network including the base station apparatus and the terminal apparatuses is referred to as a Basic service set (BSS, management area). The base station apparatus and the terminal apparatuses are also collectively referred to as a radio apparatus.

Each of the base station apparatus and the terminal apparatuses in the BSS is assumed to perform communication, based on Carrier sense multiple access with collision avoidance (CSMA/CA). Although a target of the present embodiment is an infrastructure mode, in which a base station apparatus communicates with multiple terminal apparatuses, a method of the present embodiment can also be performed in an ad hoc mode, in which terminal apparatuses directly communicate with each other. In the ad hoc mode, terminal apparatuses, instead of a base station apparatus, form a BSS. The BSS in the ad hoc mode is also referred to as an Independent Basic Service Set (IBSS). Each terminal apparatus forming an IBSS in the ad hoc mode can also be regarded as a base station apparatus below.

In an IEEE 802.11 system, each apparatus is capable of transmitting transmission frames of multiple frame types in a common frame format. Transmission frames are defined in the Physical (PHY) layer, a Medium access control (MAC) layer, and a Logical Link Control (LLC) layer individually.

A transmission frame in the PHY layer is referred to as a physical protocol data unit (PHY protocol data unit (Ppm), physical layer frame). The PPDU includes physical layer header (PHY header) including header information for performing signal processing in the physical layer and the like, a physical service data unit (PSDU) (PHY service data unit, MAC layer frame), which is a data unit to be processed in the physical layer, and the like. The PSDU can include an Aggregated MPDU (A-MPDU), in which multiple MAC protocol data units (MPDUs) to serve as a retransmission unit in a radio section are aggregated.

The PHY header includes a reference signal, such as a Short training field (STF) used for signal detection, synchronization, and the like, or a Long training field (LTF) used to acquire channel information for data demodulation, and a control signal, such as a Signal (SIG) including control information for data demodulation. The STF is categorized, depending on the supporting standard, into Legacy-STF (L-STF), High throughput-STF (HT-STF), Very high throughput-STF (VHT-STF), High efficiency-STF (HE-STF), and the like, and the LTF and the SIG are similarly categorized into L-LTF, HT-LTF, VHT-LTF, HE-LTF, L-SIG, HT-SIG, VHT-SIG, and HE-SIG. The VHT-SIG is further categorized into VHT-SIG-A1, VHT-SIG-A2, and VHT-SIG-B. Similarly, the HE-SIG is categorized into HE-SIG-A1 to 4 and HE-SIG-B.

Moreover, the PHY header can include information for identifying the transmission source BSS of the transmission frame (also referred to as BSS identification information below). The information for identifying the BSS can be, for example, the Service Set Identifier (SSID) of the BSS or the MAC address of the base station apparatus in the BSS. Alternatively, the information for identifying the BSS can be a BSS-specific value (e.g., BSS Color or the like) other than the SSID and the MAC address.

The PPDU is modulated according to the supporting standard. For example, in the IEEE 802.11n standard, the PPDU is modulated to an Orthogonal frequency division multiplexing (OFDM) signal.

The MPDU includes a MAC layer header (MAC header) including header information for performing signal processing in the MAC layer and the like, a MAC service data unit (MSDU), which is a data unit processed in the MAC layer, or a frame body, and a Frame check sequence (FCS) configured to check whether any error is included in the frame. Multiple MSDUs can be aggregated as an Aggregated MSDU (A-MSDU).

Frame types of MAC layer transmission frames are divided broadly into three categories, i.e., management frame for managing an association state between apparatuses and the like, control frame for managing a communication state between apparatuses, and data frame including actual transmission data, and each of the types is divided further into multiple subframe types. Examples of control frame include an Acknowledge (Ack) frame, a Request to send (RTS) frame, and a Clear to send (CTS) frame. Examples of management frame include a Beacon frame, a Probe request frame, a Probe response frame, an Authentication frame, an Association request frame, and an Association response frame. Examples of data frame include a Data frame and a polling (CF-poll) frame. Each apparatus can identify the frame type and the subframe type of a received frame by reading the content of the frame control field included in the MAC header.

Note that Ack may include Block Ack. Block Ack can carry out Ack for multiple MPDUs.

The Beacon frame includes a Beacon interval at which a beacon is transmitted and a Field in which an SSID is written. The base station apparatus can cyclically notify the BSS of the Beacon frame, and each of the terminal apparatuses can identify, by receiving the Beacon frame, the base station located near the terminal apparatus itself. The terminal apparatus finding out the base station apparatus, based on the Beacon frame notified by the base station apparatus, is referred to as Passive scanning. In contrast, the terminal apparatus searching for a base station apparatus by notifying the BSS of a Probe request frame, is referred to as Active scanning. The base station apparatus can transmit a Probe response frame as a response to the Probe request frame, and the content written in the Probe response frame is equivalent to that of the Beacon frame.

After identifying the base station apparatus, the terminal apparatus performs an association process on the base station apparatus. The association process is categorized into an Authentication procedure and an Association procedure. The terminal apparatus transmits an Authentication frame (Authentication request) to the base station apparatus with which the terminal apparatus desires to establish an association. Upon receipt of the Authentication frame, the base station apparatus transmits, to the terminal apparatus, an Authentication frame (Authentication response) including a status code indicating whether to give authentication to the terminal apparatus or the like. The terminal apparatus reads the status code written in the Authentication frame to thereby determine whether authentication is given to the apparatus itself from the base station apparatus. Note that the base station apparatus and the terminal apparatus can transmit and receive Authentication frames several times.

Subsequent to the Authentication procedure, the terminal apparatus transmits an Association request frame to perform an Association procedure with the base station apparatus. Upon receipt of the Association request frame, the base station apparatus determines whether to allow an association with the terminal apparatus, and transmits an Association response frame to notify the determination. The Association response frame includes an Association identifier (AID) for identifying the terminal apparatus in addition to the status code indicating whether or not the association process is allowed. The base station apparatus configures different AIDs for respective terminal apparatuses with which the base station apparatus has allowed associations, to thereby be able to manage multiple terminal apparatuses.

After the association process, the base station apparatus and the terminal apparatus perform actual data transmission. In the IEEE 802.11 system, the Distributed Coordination Function (DCF) and the Point Coordination Function (PCF), and extended versions of the functions (such as the Enhanced distributed channel access (EDC A) and Hybrid coordination function (HCF)) are defined. A description will be given below by taking a case that the base station apparatus transmits a signal to the terminal apparatus in the DCF as an example.

In the DCF, each of the base station apparatus and the terminal apparatus performs Carrier sense (CS) for checking a state of use of radio channels near the apparatus itself, prior to communication. For example, in a case of receiving a signal having a higher level than a prescribed Clear channel assessment level (CCA level) on a radio channel, the base station apparatus serving as a transmitting station postpones transmission of the transmission frame on the radio channel. In the following, a state in which a signal with the CCA level or higher is detected in the radio channel is referred to as a Busy state, and a state in which no signal with the CCA level or higher is detected is referred to as an Idle state. The CS thus performed based on power of a signal actually received by each apparatus (received power level) is referred to as physical Carrier sense (physical CS). The CCA level is also referred to as a Carrier sense level (CS level) or a CCA threshold (cCAT). In a case of detecting a signal with the CCA level or higher, the base station apparatus and the terminal apparatus start an operation of demodulating at least a PHY layer signal.

The base station apparatus performs Carrier sense only in an Inter frame space (IFS) corresponding to the type of the transmission frame to transmit, to determine whether the radio channel is in a Busy state or an Idle state. The duration in which the base station apparatus performs Carrier sense varies depending on the frame type and the subframe type of the transmission frame to be transmitted from the base station apparatus. In the IEEE 802.11 system, multiple IFSs having different durations are defined, and the IFSs include a Short IFS (SIPS) used for a transmission frame with the highest priority, a polling IFS (PCF IFS (PIFS)) used for transmission frame with a relatively high priority, a distributed control IFS (DCF IFS (DIES)) used for a transmission frame with the lowest priority, and the like. In a case that the base station apparatus transmits a data frame in the DCF, the base station apparatus uses the DIFS.

After waiting the DIPS, the base station apparatus further waits random backoff time for preventing frame collision. In the IEEE 802.11 system, a random backoff time called a Contention window (CW) is used. In the CSMA/CA, it is assumed that the transmission frame transmitted from a transmitting station is received by a receiving station in a state without any interference from other transmitting stations. For this reason, in a case where transmitting stations happen to transmit transmission frames at the same timing, the frames collide consequently, and the receiving station fails to receive the frames successfully. As a measure for this, each transmitting station waits a randomly configured time period before the start of transmission, to thereby prevent collision of the frames. Upon determination through Carrier sense that the radio channel is in an Idle state, the base station apparatus starts counting down of a CW and first acquires the right of transmission after the CW reaches 0, to thereby be able to transmit a transmission frame to the terminal apparatus. In a case that the base station apparatus determines through the Carrier sense that the radio channel is in a Busy state during the counting down of the CW, the base station apparatus stops the counting down of the CW. In a case that the radio channel then enters an Idle state, the base station apparatus restarts the counting down of the rest of the CW subsequently to the previous IFS.

The terminal apparatus serving as a receiving station receives the transmission frame, reads the PHY header of the transmission frame, and demodulates the received transmission frame. The terminal apparatus reads the MAC header of the demodulated signal to thereby be able to identify whether the transmission frame is addressed to the apparatus itself. The terminal apparatus can alternatively identify the destination of the transmission frame, based on information included in the PHY header (e.g., a Group identifier (Group ID (GID) including VHT-SIG-A).

In a case that the terminal apparatus determines that the received transmission frame is addressed to the apparatus itself and has successfully demodulated the transmission frame without any error, the terminal apparatus transmit an ACK frame indicating successful reception of the frame to the base station apparatus serving as the transmitting station. The ACK frame is one of transmission frames with the highest priority transmitted after waiting only the duration of the SIFS (no need for random backoff time). Upon receipt of the ACK frame transmitted from the terminal apparatus, the base station apparatus terminates a series of communication. In a case that the terminal fails to successfully receive the frame, the terminal apparatus does not transmit ACK. Hence, in a case of not receiving an ACK frame from the receiving station for a certain duration (SIFS+ACK frame length) after the transmission of the frame, the base station apparatus assumes that the communication has failed and terminates the communication. As described above, the termination of one communication (also referred to as burst) in the IEEE 802.11 system is always determined depending on whether an ACK frame is received, except for special cases such as a case of transmission of a broadcast signal such as a Beacon frame and a case of using fragmentation for dividing transmission data.

In a case that the terminal apparatus determines that the received transmission frame is not addressed to the apparatus itself, the terminal apparatus configures a Network allocation vector (NAV), based on the Length of the transmission frame written in the PHY header or the like. The terminal apparatus does not try communication in the duration configured for the NAV. In other words, the terminal apparatus performs the same operation as that in the case of determining that the radio channel is in a Busy state in physical CS, in the duration configured for the NAV, and hence communication control using the NA is also referred to as virtual Carrier sense (virtual CS). The NAV is also configured using a Request to send (RTS) frame and a Clear to send (CTS) frame employed to solve the issue of hidden terminals in addition to a case of being configured based on information included in the PEW header.

In contrast to the DCF, in which each apparatus performs Carrier sense to autonomously acquire the right of transmission, a control station referred to as a Point coordinator (PC) controls the right of transmission for each apparatus in the BSS in the PCF. In general, the base station apparatus serves as a PC to acquire the right of transmission for each terminal apparatus in the BSS.

Examples of the communication period of the PCF include a Contention free period (CFP) and a Contention period (CP). During the CP, communication is performed based on the above-described DCF, and the PC controls the right of transmission during the CFP. The base station apparatus serving as the PC, broadcasts a Beacon frame including the duration of the CFP (CFP Max duration) and the like, in the BSS prior to communication in the PCF. Note that the PIES is used for transmission of the Beacon frame for broadcast at the time of the start of PCF transmission, and the transmission is performed without waiting for the CW. The terminal apparatus that has received the Beacon frame configures, for the NAV, the duration of the CFP written in the Beacon frame. Thereafter, until the NAV elapses or a signal broadcasting the termination of the CFP in the BSS (e.g., a data frame including CF-end) is received, the terminal apparatus can acquire the right of transmission only in a case of receiving a signal for signalling acquisition of the right of transmission (e.g., data frame including CF-poll) transmitted from the PC. Note that, during the CFP, no collision of packets occurs in the same BSS, and hence each terminal apparatus has no need of a random backoff time used in the DCF.

Figure 4:
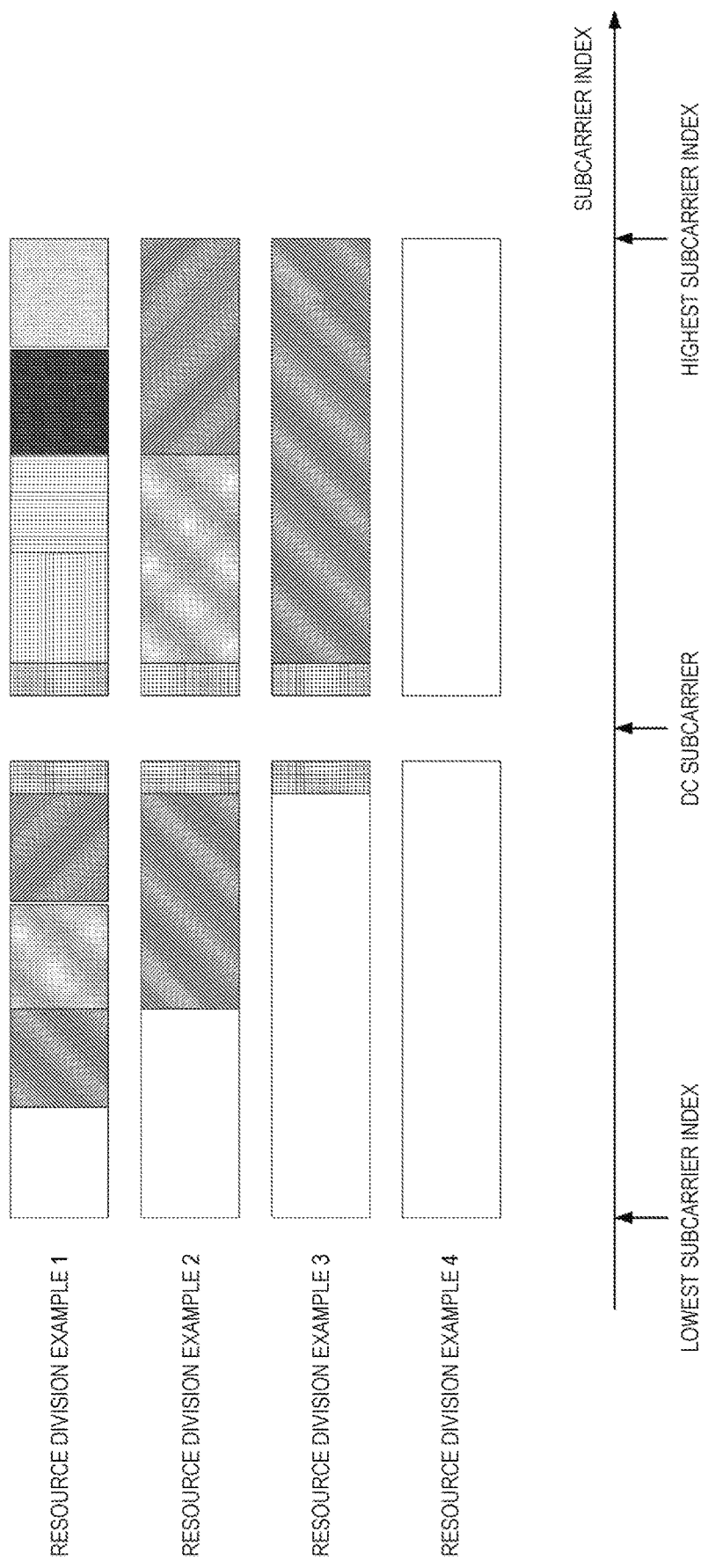
FIG. 4 is a schematic diagram illustrating examples of division of a radio medium according to the aspect of the present invention.

The radio medium can be divided into multiple Resource units (RUs). FIG. 4 is a schematic diagram illustrating examples of a divided state of a radio medium. For example, in resource division example 1, the radio communication apparatus can divide a frequency resource (subcarriers), which is a radio medium, into nine RUs. Similarly, in resource division example 2, the radio communication apparatus can divide the subcarriers, which are the radio medium, into five RUs. Of course, the resource division examples illustrated in FIG. 4 are merely examples, and multiple RUs can include different numbers of subcarriers, for example. The radio medium divided into RUs can also include a spatial resource as well as a frequency resource. By mapping frames addressed to different terminal apparatuses in the respective RUs, the radio communication apparatus (e.g., AP) can transmit frames to multiple terminal apparatuses (e.g., multiple STAs) simultaneously. The AP can write information indicating the state of division of the radio medium (Resource allocation information) as common control information in the PHY header of the frame that the apparatus itself transmits. Moreover, the AP can write information indicating the RU to which a frame addressed to each STA is mapped (resource unit assignment information) as specific control information in the PHY header of the frame that the apparatus itself transmits.

By mapping frames to respective allocated RUs and transmitting the frames accordingly, the multiple terminal apparatuses (e.g., multiple STAs) can transmit the frames simultaneously. After receiving frames including trigger information (Trigger frame (TF)) transmitted from the AP, the multiple STAs wait a prescribed duration and can thereafter perform frame transmission. Each STA can identify the RU allocated to the apparatus itself, based on the information written in the TF Moreover, each STA can acquire the RU through random access using the TF as a standard.

The AP can allocate multiple RUs to one STA simultaneously. The multiple RUs can include contiguous subcarriers or can include discontiguous subcarriers. The AP can transmit one frame by using the multiple RUs allocated to one STA or can transmit multiple frames by mapping the frames to different RUs. At least one of the multiple frames can be a frame including common control information for the multiple terminal apparatuses to which Resource allocation information is transmitted.

Multiple RUs can be allocated to one STA by the AP. Each STA can transmit one frame by using the multiple RUs thus allocated. Using multiple RUs allocated to the STA, the STA can transmit multiple frames by mapping multiple frames to different RUs. The multiple frames can be frames of different frame types.

The AP can assign multiple Associate IDs (AIDs) to one STA. The AP can allocate a RU to each of the multiple AIDs assigned to one STA. The AP can transmit different frames to the multiple AIDS assigned to one STA, by using RUs allocated to the multiple AIDs. The different frames can be frames of different frame types.

Multiple Associate IDs (AIDs) can be assigned to one STA by the AP. RUs can be allocated to the respective multiple AIDs assigned to the one STA. Each STA can recognize all the RUs allocated to the multiple AIDs assigned to the apparatus itself, as RUs allocated to the apparatus itself, and transmit one frame by using the multiple RUs thus allocated. Moreover, one STA can transmit multiple frames by using the multiple RUs thus allocated. In this case, each of the multiple frames can be transmitted by including information indicating the AID(s) associated with the RU(s) allocated to the frame. The AP can transmit different frames to the multiple AIDs assigned to one STA, by using RUs allocated to the multiple AIDs. The different frames can be frames of different frame types.

The base station apparatus and the terminal apparatuses are also collectively referred to as a radio communication apparatus below. In addition, information exchanged in communication by a radio communication apparatus with another radio communication apparatus is also referred to as data. In other words, radio communication apparatuses include a base station apparatus and a terminal apparatus.

Each radio communication apparatus has either the function of transmitting a PPDU or the function of receiving a PPDU or both of the functions. FIG. 1 is a diagram illustrating examples of a PPDU structure transmitted from a radio communication apparatus. The PPDU supporting the IEEE 802.11a/b/g standards is a structure including L-STF, L-LTF, L-SIG, and Data frame (such as MAC Frame, payload, data unit, data, and/or information bits). The PPDU supporting the IEEE 802.11n standard is a structure including L-STF, L-LTF, L-SIG, HT-SIG, HT-STF, HT-LTF, and a Data frame. The PPDU supporting the IEEE 802.11ac standard is a structure including some of or all L-STF, L-STF, L-SIG, VHT-SIG-A, VHT-STF, VHT-LIT, VHT-SIG-B, and a MAC frame. The PPDU that is being discussed in the IEEE 802.11ax standard is a structure including some of or all L-STF, L-LTF, L-SIG, RL-SIG, in which L-SIG is repeated in terms of time, HE-SIG-A, HE-STF, HE-LTF, HE-SIG-B, and a Data frame.

L-STF, L-LTF, and L-SIG enclosed by dotted lines in FIG. 1 correspond to a structure commonly used in the IEEE 802.11 standards (L-STF, L-LTF, and L-SIG are also referred to as an L-header collectively below). Specifically, for example, radio communication apparatuses supporting the IEEE 802.11a/b/g standards can appropriately receive the L-header in a PPDU supporting the IEEE 802.11n/ac standards. Radio communication apparatuses supporting the IEEE 802.11a/b/g standards can receive a PPDU supporting the IEEE 802.11n/ac standards by regarding the PPDU as a PPDU supporting the IEEE 802.11a/b/g standards.

However, the radio communication apparatuses supporting the IEEE 802.11a/b/g standards are not capable of demodulating the PPDU supporting the IEEE 802.11n/ac standards subsequent to the L-header, and hence the radio communication apparatuses are not able to demodulate information on a Transmitter Address (TA), a Receiver Address (RA) and Duration/ID field to be used for configuration of a NAV.

As a method for the radio communication apparatus supporting the IEEE 802.11a/big standards to appropriately configure a NAV (perform a reception operation for a prescribed duration), IEEE 802.11 defines a method of inserting Duration information in L-SIG. Information on the transmission rate in L-SIG (RATE field, L-RATE field, L-RATE, L_DATARATE, L_DATARATE field) and information on transmission duration (LENGTH field, L_LENGTH field, L_LENGTH) are used by the radio communication apparatus supporting the IEEE 802.11a/b/g standards to appropriately configure a NAV.

Figure 2:
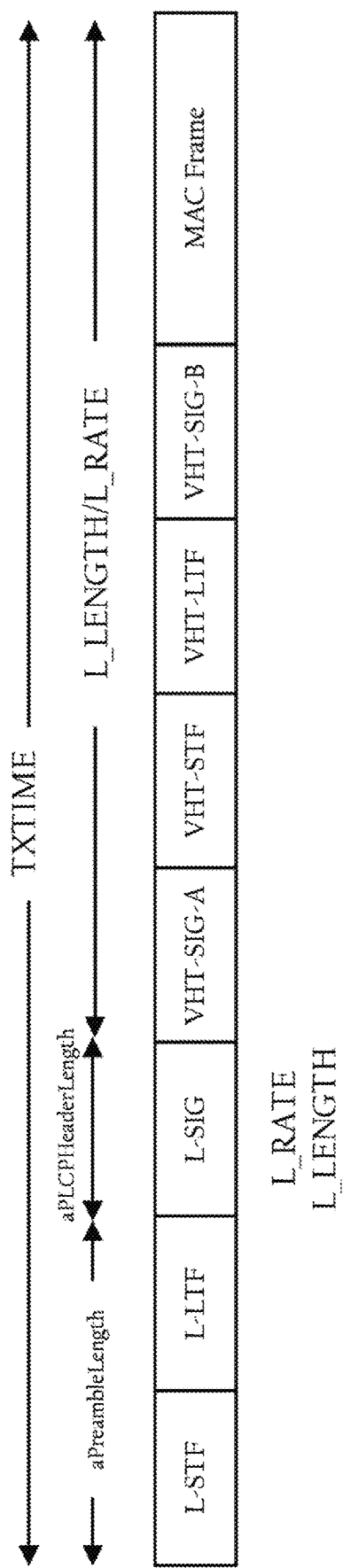
FIG. 2 is a diagram illustrating an example of a frame structure according to the aspect of the present invention.

FIG. 2 is a diagram illustrating an example of a method of Duration information inserted to L-SIG. Although a PPDU structure supporting the IEEE 802.11ac standard is illustrated as an example in FIG. 2, the PPDU structure is not limited thereto. The PPDU structure may be a PPDU structure supporting the IEEE 802.11n standard or a PPDU structure supporting the IEEE 802.11ax standard. TXTIME includes information on the length of the PPDU, aPreambleLength includes information on the length of the preamble (L-STF+L-LTF), and aPLCPHeaderLength includes information on the length of the PLCP header (L-SIG). Equation (1) below is a mathematical expression illustrating an example of a method of calculating L_LENGTH.

[Equation 1]

$$L\_LENGTH = \left\lceil \frac{\left(\frac{(TXTIME - SignalExtension) - (aPreambleLength + aPLCPHeaderLength)}{aSymbolLength}\right) \times N_{ope} - \left\lceil \frac{aPLCPServiceLength + aPLCPConvolutionalTailLength}{8} \right\rceil}{} \right\rceil \quad (1)$$

Here, Signal Extension is, for example, a virtual period configured to be compatible with the IEEE 802.11 standards, and Nops indicates information associated with L_RATE. aSymbolLength is information on the duration of one symbol (OFDM symbol or the like), aPLCPServiceLength indicates the number of bits included in PLCP Service field, and aPLCPConvolutionalTailLength indicates the number of tail bits of a convolutional code. The radio communication apparatus can calculate L_LENGTH by using Equation (1), for example, and insert L_LENGTH into L-SIG. Note that a method of calculating L_LENGTH is not limited to Equation (1). For example, L_LENGTH can be calculated in accordance with Equation (2) below.

[Equation 2]

$$L\_LENGTH = \left\lceil \frac{((TXTIME - SignalExtension) - 20)}{4} \right\rceil \times 3 - 3 \quad (2)$$

In a case that the radio communication apparatus transmits a PPDU in L-SIG TXOP Protection, the radio communication apparatus calculates L_LENGTH in accordance with Equation (3) or Equation (4) below.

[Equation 3]

$$L\_LENGTH = \left\lceil \frac{\left(\frac{(L - SIGDuration - SignalExtension) - (aPreambleLength + aPLCPHeaderLength)}{aSymbolLength}\right) \times N_{ope} - \left\lceil \frac{aPLCPServiceLength + aPLCPConvolutionalTailLength}{8} \right\rceil}{} \right\rceil \quad (3)$$

[Equation 4]

$$L\_LENGTH = \left\lceil \frac{((L - SIGDuration - SignalExtension) - 20)}{4} \right\rceil \times 3 - 3 \quad (4)$$

Here, L-SIG Duration indicates information on the PPDU including L_LENGTH calculated in accordance with Equation (3) or Equation (4), for example, and a duration summing the durations of Ack and SIFS expected to be transmitted as a response to the PPDU from the addressed radio communication apparatus. The radio communication apparatus calculates L-SIG Duration in accordance with Equation (5) and Equation (6) below.

[Equation 5]

$$L - SIGDuration = (T_{init\_PPDU} - (aPreambleLength + aPLCPHeaderLength)) + SIFS + T_{Res\_PPDU} \quad (5)$$

[Equation 6]

$$L - SIGDuration = (T_{MACDur} - SIFS - (aPreambleLength + aPLCPHeaderLength)) \quad (6)$$

Here, Tinit_PPDU indicates information on the duration of PPDU including L_LENGTH calculated in accordance with Equation (5), and TRes_PPDU indicates information on the duration of PPDU of a response expected for the PPDU including L_LENGTH calculated in accordance with Equation (5). TMACDur indicates information associated with the value of Duration/ID field included in the MAC frame in the PPDU including L_LENGTH calculated in accordance with Equation (6). In a case that the radio communication apparatus is an Initiator (starter, transmission entity, Transmitter), the radio communication apparatus calculates L_LENGTH by using Equation (5); in a case that the radio communication apparatus is a Responder (receiving entity, Receiver), the radio communication apparatus calculates L_LENGTH by using Equation (6).

Figure 3:
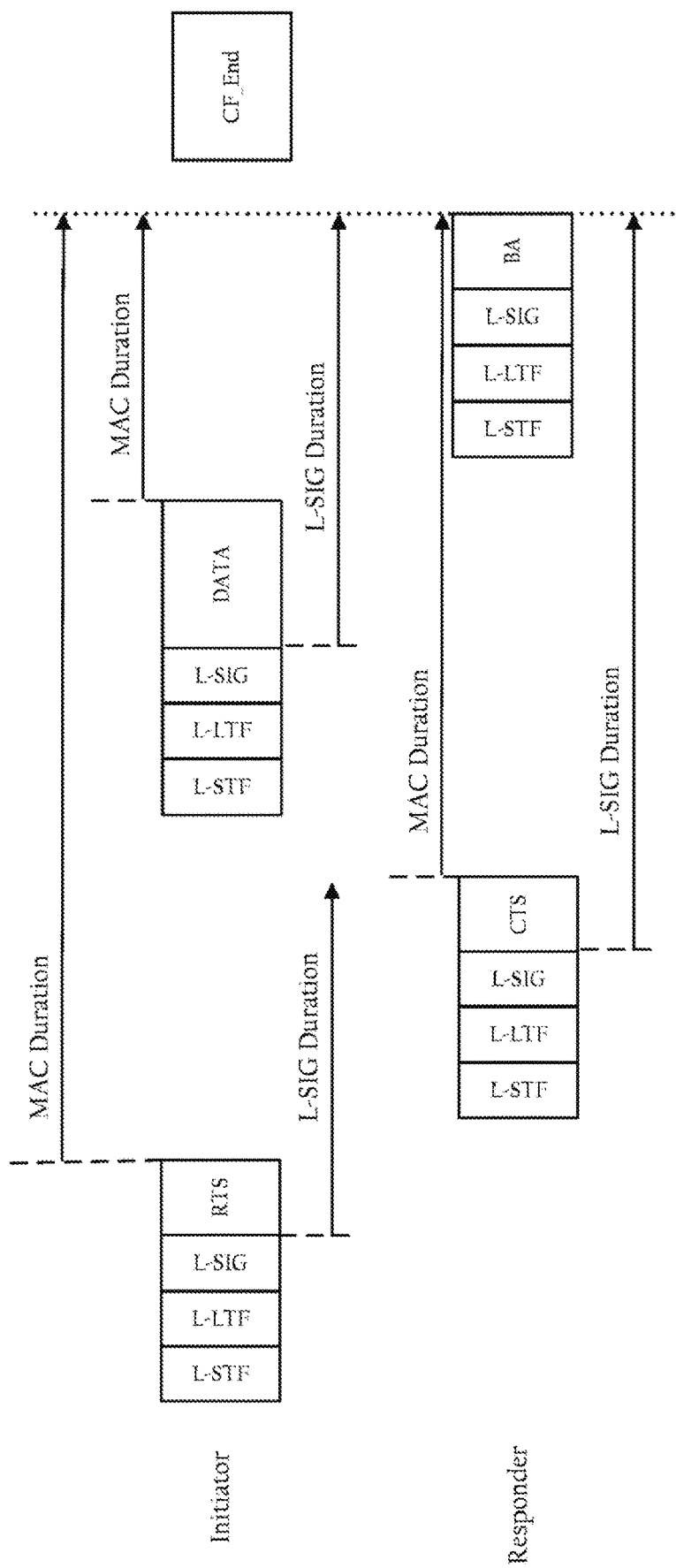
FIG. 3 is a diagram illustrating an example of communication according to the aspect of the present invention.

FIG. 3 is a diagram illustrating an example of L-SIG Duration in L-SIG TXOP Protection. DATA (frame, payload, data, or the like) includes one of or both the MAC frame and the PLCP header. BA denotes Block Ack or Ack. The PPDU can be constituted by including L-STF, L-LTF, and L-SIG and further including any of or multiple of DATA, BA, RTS, and CTS. Although the example illustrated in FIG. 3 indicates L-SIG TXOP Protection using RTS/CTS, CTS-to-Self may be used instead. Here, MAC Duration is a duration indicated by the value of Duration/ID field. The Initiator can transmit a CF-End frame to notify the end of the duration of L-SIG TXOP Protection.

Next, description will be given of a method of identifying a BSS in the frame that the radio communication apparatus receives. In order for the radio communication apparatus to identify a BSS in a received frame, it is preferable that the radio communication apparatus transmitting a PPDU insert, to the PPDU, information for identifying BSS in the PPDU (BSS color, BSS identification information, BSS-specific value). Information indicating BSS color can be included in HE-SIG-A.

The radio communication apparatus can transmit L-SIG multiple times (L-SIG Repetition). For example, the receiving-side radio communication apparatus receives L-SIG transmitted multiple times by using Maximum Ratio Combining (MRC) to thereby improve accuracy in demodulation of L-SIG. Moreover, in a case that the radio communication apparatus successfully, completes reception of L-SIG by using MRC, it is possible to interpret that the PPDU including the L-SIG is a PPDU supporting the IEEE 802.11ax standard.

The radio communication apparatus can perform, even during an operation of receiving a PPDU, an operation of receiving part of a PPDU other than the PPDU (e.g., preamble, L-STF, L-LTF, PLCP header or the like defined in IEEE 802.11) (also referred to as duplex reception operation). In a case of detecting, during the operation of receiving the PPDU, part of a PPDU other than the PPDU, the radio communication apparatus can update part of or the entire information on the destination address, transmission source address, and a duration of a PPDU or DATA.

Ack and BA can also be referred to as response (response frame). Moreover, Probe response, Authentication response, and Association response can be referred to as response.

1. First Embodiment

Figure 5:
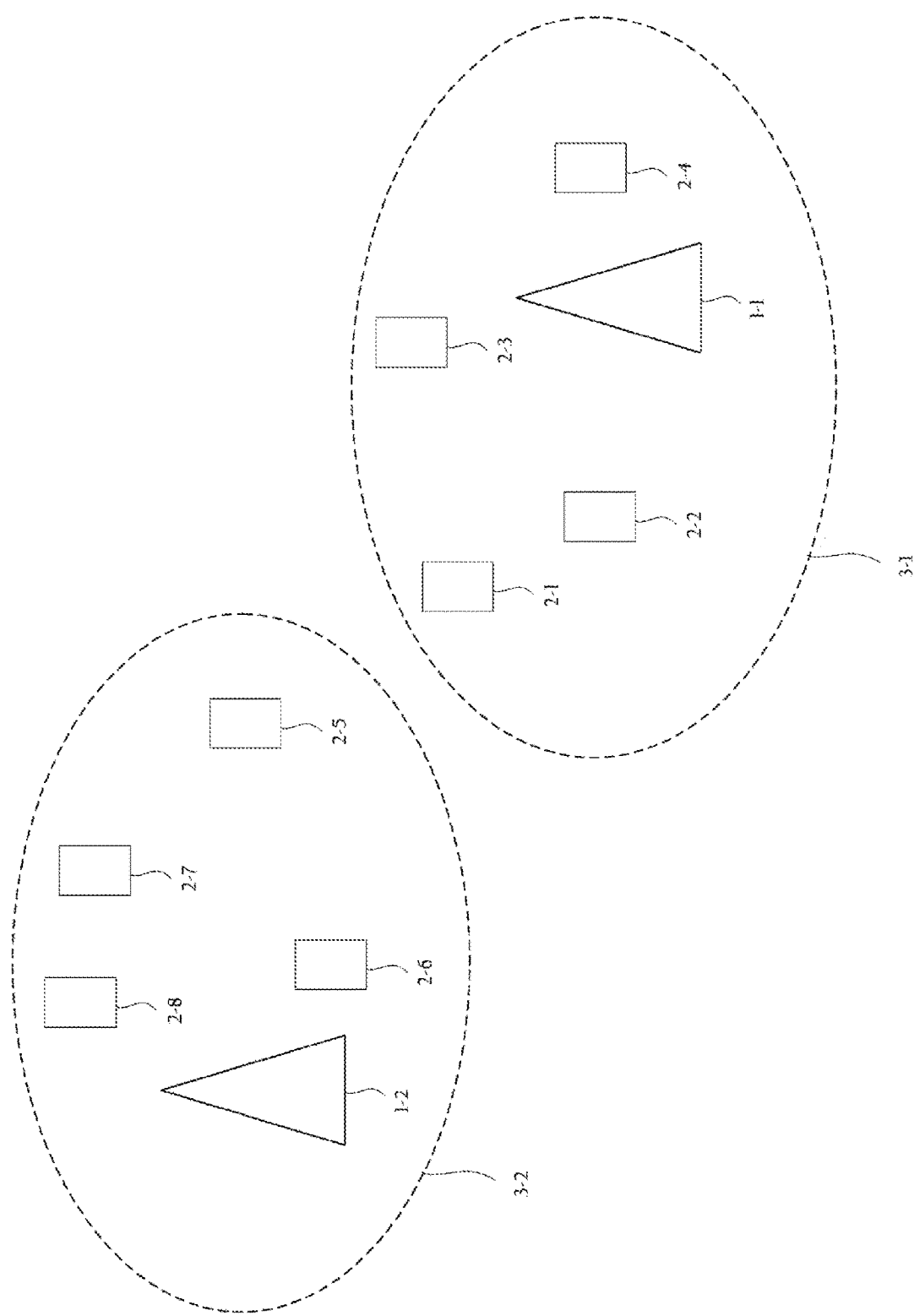
FIG. 5 is a diagram illustrating a configuration example of a communication system according to the aspect of the present invention.

FIG. 5 is a diagram illustrating an example of a radio communication system according to the present embodiment. A radio communication system 3-1 includes a radio communication apparatus 1-1 and radio communication apparatuses 2-1 to 4. The radio communication apparatus 1-1 is also referred to as a base station apparatus 1-1, and the radio communication apparatuses 2-1 to 4 are also referred to as terminal apparatuses 2-1 to 4. Moreover, the radio communication apparatuses 2-1 to 4 and the terminal apparatuses 2-1 to 4 are also referred to as radio communication apparatuses 2A and terminal apparatuses 2A as apparatuses associated with the radio communication apparatus 1-1. The radio communication apparatus 1-1 and each radio communication apparatus 2A are wirelessly connected to each other and are in a state capable of transmitting and receiving a PPDU to and from each other. The radio communication system according to the present embodiment includes a radio communication system 3-2 in addition to the radio communication system 3-1. The radio communication system 3-2 includes a radio communication apparatus 1-2 and radio communication apparatuses 2-5 to 8. The radio communication apparatus 1-2 is also referred to as a base station apparatus 1-2, and the radio communication apparatuses 2-5 to 8 are also referred to as terminal apparatuses 2-5 to 8. Moreover, the radio communication apparatuses 2-5 to 8 and the terminal apparatuses 2-5 to 8 are also referred to as radio communication apparatuses 2B and terminal apparatuses 2B as apparatuses associated with the radio communication apparatus 1-2. Although the radio communication system 3-1 and the radio communication system 3-2 from different BSSs, this does not necessarily mean that the radio communication system 3-1 and the radio communication system 3-2 have different Extended Service Sets (ESSs). ESS indicates a service set forming a Local Area Network (LAN). In other words, radio communication apparatuses belonging to the same ESS can be regarded, by higher layers, as belonging to the same network. Note that the radio communication systems 3-1 and 3-2 can further include multiple radio communication apparatuses.

It is assumed, in the following description, a signal transmitted from the radio communication apparatus 2A reaches the radio communication apparatus 1-1 and the radio communication apparatuses 2BA while not reaching to the radio communication apparatus 1-2, in FIG. 5. Specifically, in a case that the radio communication apparatus 2A transmits a signal by using a channel, the radio communication apparatus 1-1 and the radio communication apparatus 2B determine that the channel is in a Busy state while the radio communication apparatus 1-2 determines that the channel is in an Idle state. In addition, it is assumed that a signal transmitted from the radio communication apparatus 2B reaches the radio communication apparatus 1-2 and the radio communication apparatuses 2A while not reaching the radio communication apparatus 1-1. Specifically, in a case that the radio communication apparatus 2B transmits a signal by using a channel, the radio communication apparatus 1-2 and the radio communication apparatus 2A determine that the channel is in a Busy state while the radio communication apparatus 1-1 determines that the channel is in an Idle state.

Figure 6:
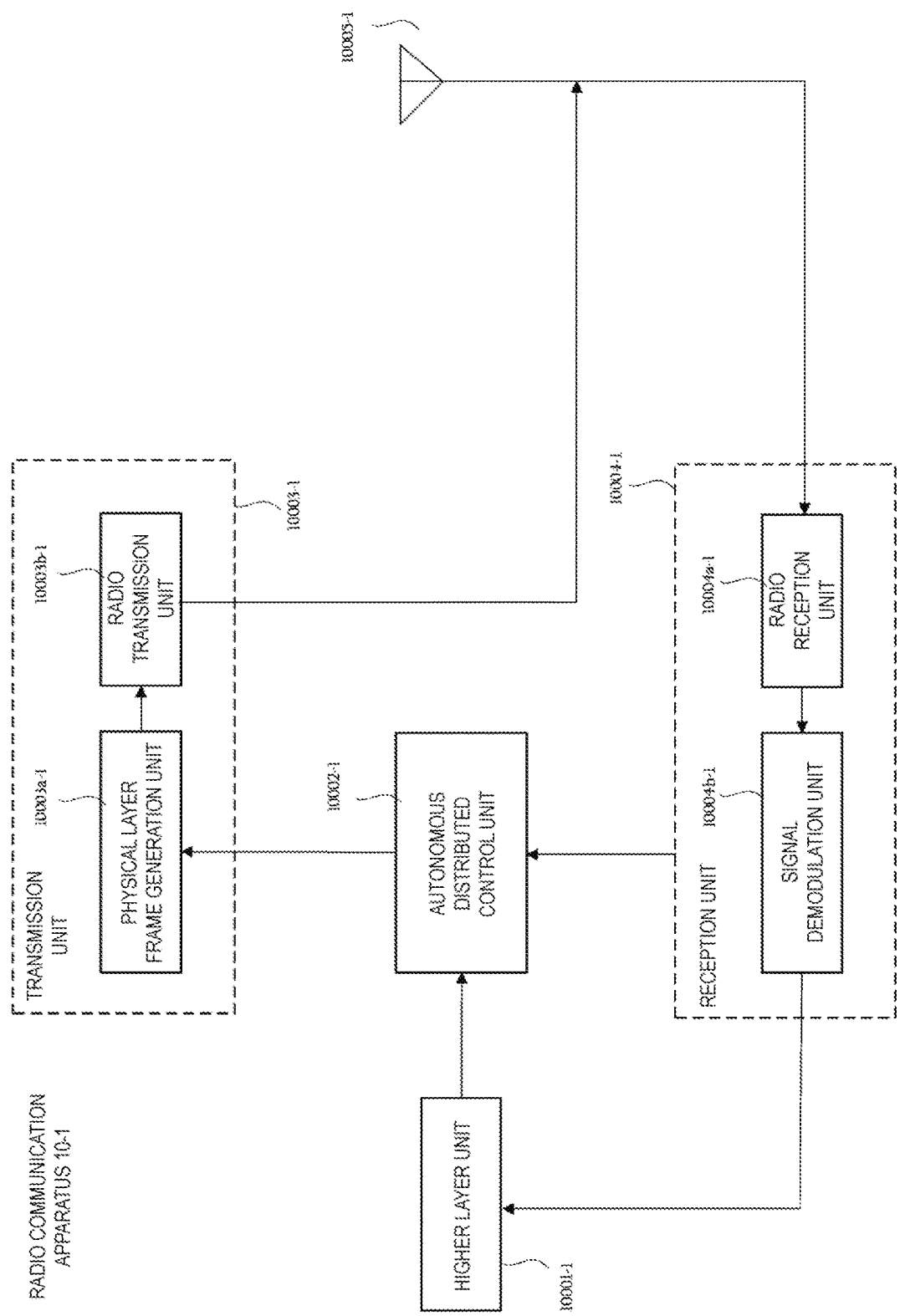
FIG. 6 is a block diagram illustrating a configuration example of a radio communication apparatus according to the aspect of the present invention.

FIG. 6 is a diagram illustrating an example of an apparatus configuration of the radio communication apparatuses 1-1, 1-2, 2A, and 2B (referred to also as a radio apparatus 10-1 collectively below). The radio communication apparatus 10-1 includes a higher layer unit (higher layer processing step) 10001-1, an autonomous distributed control unit (autonomous distributed control step) 10002-1, a transmission unit (transmission step) 10003-1, a reception unit (reception step) 10004-1, and an antenna unit 10005-1.

The higher layer unit 10001-1 is associated with another network and is able to notify the autonomous distributed control unit 10002-1 of information on traffic. The information on traffic may be, for example, information addressed to another radio communication apparatus or may be control information included in a management frame or a control frame.

Figure 7:
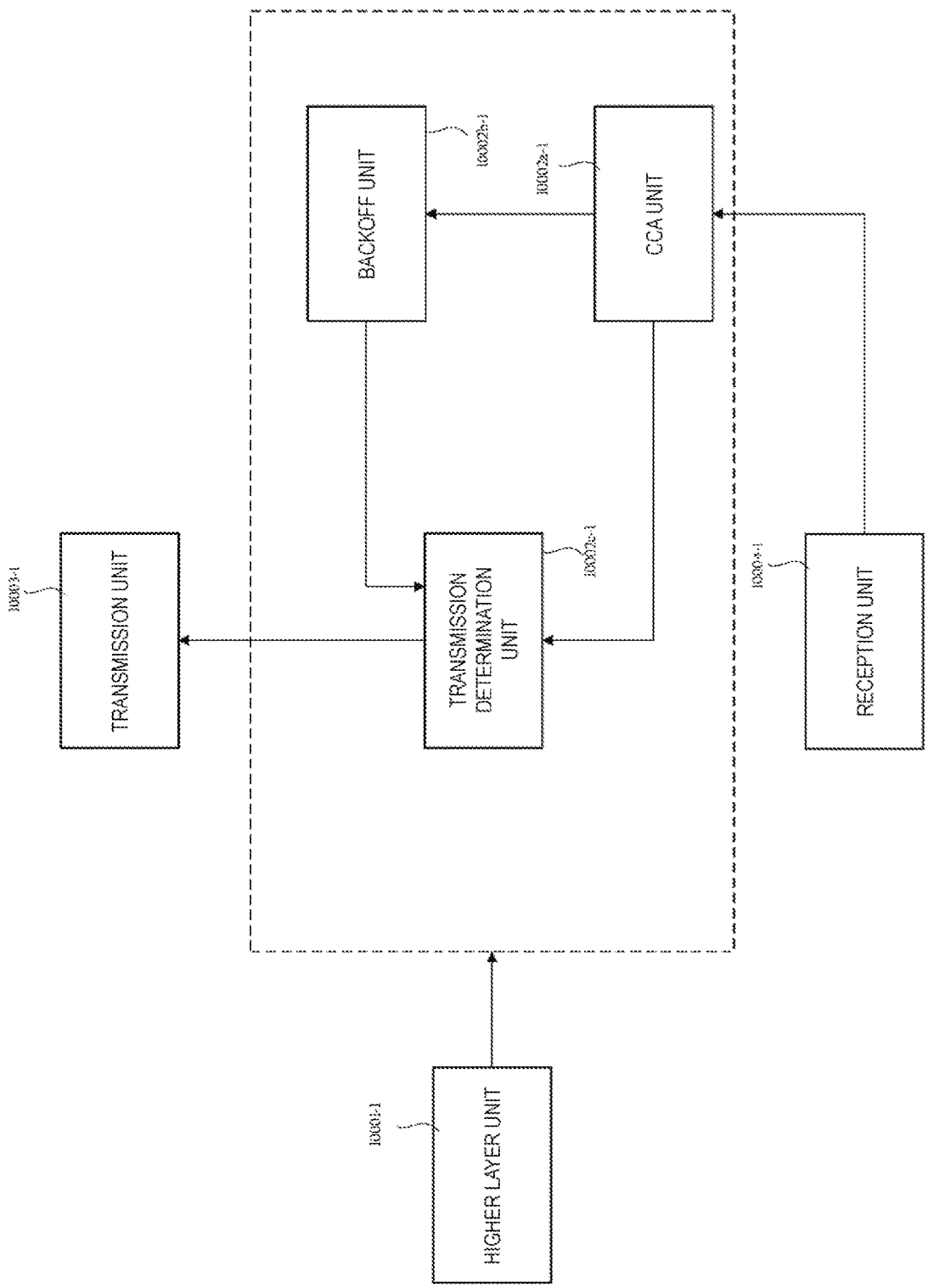
FIG. 7 is a block diagram illustrating a configuration example of the radio communication apparatus according to the aspect of the present invention.

FIG. 7 is a diagram illustrating an example of an apparatus configuration of the autonomous distributed control unit 10002-1. The autonomous distributed control unit 10002-1 includes a CCA unit (CCA step) 10002a-1, a backoff unit (backoff step) 10002b-1, and a transmission determination unit (transmission determination step) 10002c-1.

By using one of or both information on the power of a receive signal received through a radio resource and information on the receive signal (including information after decoding) both notified from the reception unit, the CCA unit 10002a-1 can determine a state of the radio resource (including determination on busy or idle). The CCA unit 10002a-1 can notify the backoff unit 10002b-1 and the transmission determination unit 10002c-1 of the radio resource state determination information.

The backoff unit 10002b-1 can perform backoff by using the radio resource state determination information. The backoff unit 10002b-1 generates a CW and has a countdown function. For example, in a case that the radio resource state determination information indicates idle, the backoff unit 10002b-1 can perform countdown of the CW; in a case that the radio resource state determination information indicates busy, the backoff unit 10002b-1 can stop countdown of the CW. The backoff unit 10002b-1 can notify the transmission determination unit 10002c-1 of a CW value.

The transmission determination unit 10002c-1 performs transmission determination by using one of or both the radio resource state determination information and the CW value. For example, in a case that the radio resource state determination information indicates idle and the CW value is 0, the transmission determination unit 10002c-1 can notify the transmission unit 10003-1 of transmission determination information. Alternatively, in a case that the radio resource state determination information indicates idle, the transmission determination unit 10002c-1 can notify the transmission unit 10003-1 of transmission determination information.

The transmission unit 10003-1 includes a physical layer frame generation unit (physical layer frame generation step) 10003a-1 and a radio transmission unit (radio transmission step) 10003b-1. The physical layer frame generation unit 10003a-1 has a function of generating a physical layer frame (PPDU), based on the transmission determination information notified from the transmission determination unit 10002c-1. The physical layer frame generation unit 10003a-1 performs error correction coding, modulation, precoding filter multiplication, and the like on transmission frames transmitted from higher layers. The physical layer frame generation unit 10003a-1 notifies the radio transmission unit 10003b-1 of the generated physical layer frame.

The frame generated by the physical layer frame generation unit 10003a-1 includes control information. The control information includes information indicating the RU (here, RU includes both frequency resource and spatial resource) to which data addressed to each radio communication apparatus is mapped. The frame generated by the physical layer frame generation unit 10003a-1 includes a Trigger frame providing an instruction of frame transmission to the radio communication apparatus that is a destination terminal. The Trigger frame includes information indicating the RU to be used by the radio communication apparatus to which frame transmission is instructed, to transmit a frame.

The radio transmission unit 10003b-1 converts the physical layer frame generated by the physical layer frame generation unit 10003a-1 into a Radio Frequency (RF) band signal to generate a radio frequency signal. Processing performed by the radio transmission unit 10003b-1 includes digital-analog conversion, filtering, frequency conversion from baseband to RF band, and the like.

The reception unit 10004-1 includes a radio reception unit (radio reception step) 10004a-1 and a signal demodulation unit (signal demodulation step) 10004b-1. The reception unit 10004-1 generates information on receive signal power from the RF band signal received by the antenna unit 10005-1. The reception unit 10004-1 can notify the CCA unit 10002a-1 of information on the receive signal power and information on the receive signal.

The radio reception unit 10004a-1 has a function of converting the RF band signal received by the antenna unit 10005-1 into a baseband signal and generating a physical layer signal (e.g., physical layer frame). Processing performed by the radio reception unit 10004a-1 includes frequency conversion from RF band to baseband, filtering, and analog-digital conversion.

The signal demodulation unit 10004b-1 has a function of demodulating the physical layer signal generated by the radio reception unit 10004a-1. Processing performed by the signal demodulation unit 10004b-1 includes channel equalization, demapping, error correction decoding, and the like. The signal demodulation unit 10004b-1 can extract, from the physical layer signal, information included in the physical layer header, information included in the MAC header, and information included in the transmission frame, for example. The signal demodulation unit 10004b-1 can notify the higher layer unit 10001-1 of the extracted information. Note that the signal demodulation unit 10004b-1 can extract any of or all the information included in the physical layer header, the information included in the MAC header, and the information included in the transmission frame.

The antenna unit 10005-1 has a function of transmitting the radio frequency signal generated by the radio transmission unit 10003b-1 to a radio space toward a radio apparatus 0-1. The antenna unit 10005-1 also has a function of receiving a radio frequency signal transmitted from the radio apparatus 0-1.

The radio communication apparatus 10-1 writes information indicating the duration in which the apparatus itself uses a radio medium, in the PHY header or the MAC header of the frame to transmit, to thereby be able to cause radio communication apparatuses near the apparatus itself to configure a NAV only during the duration. For example, the radio communication apparatus 10-1 can write information indicating the duration in the Duration/ID field or Length field of the frame to transmit. The NAV duration configured in the radio communication apparatus near the apparatus itself is herein referred to as a TXOP duration (or simply TXOP) obtained by the radio communication apparatus 10-1. In addition, the radio communication apparatus 10-1 that has obtained the TXOP is referred to as a TXOP holder. The frame type of the frame that the radio communication apparatus 10-1 transmits to obtain the TXOP is not particularly limited, and may be a control frame (e.g., RTS frame or CTS-to-self frame) or a data frame.

The radio communication apparatus 10-1, which is the TXOP holder, can transmit a frame to a radio communication apparatus other than the apparatus 10-1 itself during the TXOP. In a case that the radio communication apparatus 1-1 is a TXOP holder, the radio communication apparatus 1-1 can transmit a frame to the radio communication apparatus 2A in the TXOP duration. Moreover, the radio communication apparatus 1-1 can provide, to the radio communication apparatus 2A, an instruction of frame transmission addressed to the radio communication apparatus 1-1 itself, in the TXOP duration. The radio communication apparatus 1-1 can transmit, to the radio communication apparatus 2A, a Trigger frame including information providing an instruction of frame transmission addressed to the radio communication apparatus 1-1 itself, in the TXOP duration.

The radio communication apparatus 1-1 may ensure TXOP for the entire communication band having a possibility of performing frame transmission (e.g., Operation bandwidth), or may ensure TXOP for a specific communication band (Band) such as a communication band in which a frame is to be actually, transmitted (e.g., Transmission bandwidth).

The radio communication apparatus that provides an instruction of frame transmission in the TXOP duration obtained by the radio communication apparatus 1-1 is not necessarily limited to the radio communication apparatus associated with the apparatus 1-1 itself. For example, the radio communication apparatus can provide an instruction of frame transmission to a radio communication apparatus not associated with the apparatus itself, to transmit a management frame, such as a Reassociation frame, and a control frame, such as a RTS/CTS frame, to a radio communication apparatus near the apparatus itself.

Figure 8:
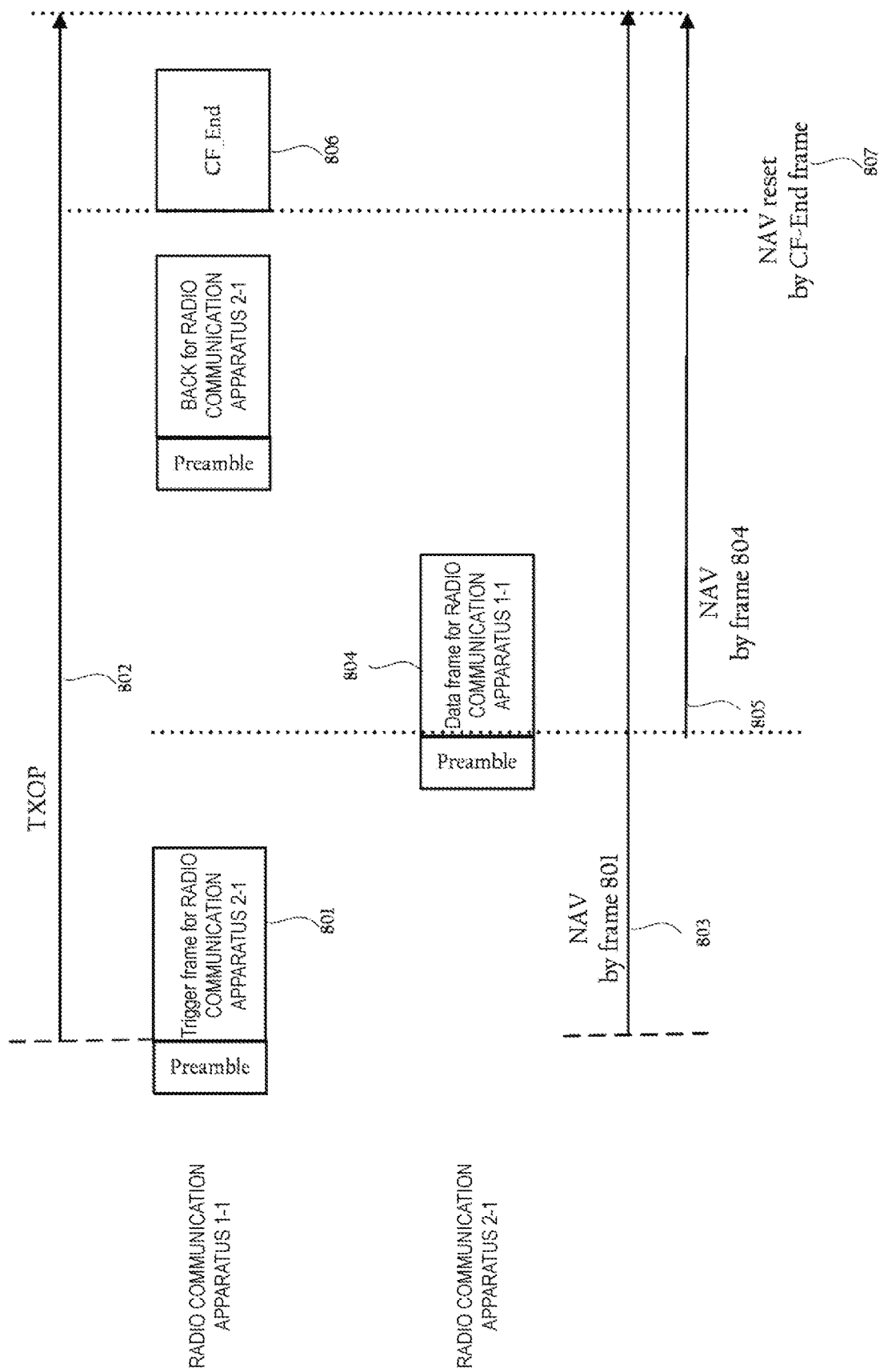
FIG. 8 is a diagram illustrating an example of communication according to the aspect of the present invention.

FIG. 8 is a diagram illustrating an example of frame exchange between the radio communication apparatus 1-1 and the radio communication apparatus 2-1 according to the present embodiment. In FIG. 8, the signal denoted by Preamble represents a PHY header including STF, LTF, and SIG. First, the radio communication apparatus 1-1 transmits a frame (frame 801) including the TXOP duration (TXOP duration 802) that the apparatus itself is to obtain, to obtain the TXOP. Note that, although description is omitted here, the radio communication apparatus 1-1 can transmit the frame 801, based on a CSMA/CA transmission procedure. In this operation, the radio communication apparatus 1-1 can change the CCA level and the minimum receive sensitivity at the time of transmitting the frame 801. The radio communication apparatus 1-1 can change the CCA level and the minimum receive sensitivity at the time of transmitting the frame 801, based on the TXOP duration obtained using the frame 801, the number of radio communication apparatuses 2A to which a transmission instruction is transmitted in the TXOP, and the like. For example, in a case that the TXOP duration obtained using the frame 801 is shorter than a prescribed value, the radio communication apparatus 1-1 can increase the CCA level than that for a case of transmitting another frame.

The radio communication apparatus 2-1 that has received the frame 801 configures a NAV only for the TXOP duration 802, based on information included in the frame 801. Thereafter, the radio communication apparatus 2-1 is not allowed to perform frame transmission in the TXOP duration 802 in all cases other than the case of being instructed by the radio communication apparatus 1-1. The radio communication apparatus 2-1 can notify in advance the radio communication apparatus 1-1 of Capability information indicating whether to accept the configuration of a NAV by the frame 801 and whether frame transmission based on the Trigger frame transmitted from the radio communication apparatus 1-1 is possible. The radio communication apparatus 2-1 can notify the Capability information in the Association procedure (Authentication procedure) with the radio communication apparatus 1-1. Note that it is illustrated, in FIG. 8, that the TXOP and NAV durations are started from the end of the Preamble of the frame. However, definition of the starts of the TXOP and NAV durations according to the present embodiment is not necessarily limited to the definition illustrated in FIG. 8. For example, the TXOP and NAV durations may be configured from the beginning of the frame or may be configured from the end of the frame.

Note that the radio communication apparatus 2-1 may continuously perform a reception operation in the TXOP duration 802. The radio communication apparatus 1-1 can write, in the frame 801, information indicating whether to perform frame transmission to a certain radio communication apparatus, in the TXOP obtained in the frame 801. The radio communication apparatus 1-1 can include, in the frame 801, information indicating whether or not to provide an instruction of transmission of a frame addressed to the radio communication apparatus 1-1, to a certain radio communication apparatus, in the TXOP obtained in the frame 801.

The radio communication apparatus 2-1 can receive a frame transmitted from the radio communication apparatus 1-1, which is the TXOP holder in the TXOP. In a case that the frame transmitted from the radio communication apparatus 1-1, which is the TXOP holder in the TXOP, includes information providing, to the apparatus 2-1 itself, an instruction of transmission of a frame addressed to the radio communication apparatus 1-1, the radio communication apparatus 2-1 can transmit a frame (frame 804) addressed to the radio communication apparatus 1-1.

The frame including information indicating that the radio communication apparatus 1-1 provides an instruction of frame transmission to another radio communication apparatus is also referred to as a Trigger frame. As illustrated in FIG. 8, the Trigger frame can be transmitted simultaneously with a frame for obtaining a TXOP. Here, simultaneous transmission includes a case that both information on the TXOP and information on the Trigger frame are written in the frame 801. Moreover, although illustration is omitted in FIG. 8, the Trigger frame can be transmitted simultaneously with a data frame addressed to the radio communication apparatus 2-1.

The Trigger frame can include information indicating the RU to which data is mapped at the time when the radio communication apparatus 2-1 transmits a frame.

Note that, in a case that the radio communication apparatus 2-1 determines that the received Trigger frame is a frame transmitted from a radio communication apparatus belonging to another BSS, the radio communication apparatus 2-1 can discard the frame.

In a case that the radio communication apparatus 2-1 transmits, in the TXOP, a frame in accordance with an instruction from the TXOP holder of the TXOP, the radio communication apparatus 2-1 can transmit the frame after the elapse of a prescribed frame transmission wait time (IFS). For example, the radio communication apparatus 2-1 can transmit the frame after the elapse of the time corresponding to SIFS. The radio communication apparatus 2-1 need not perform Carrier sense during the prescribed frame wait time.

The radio communication apparatus 2-1 can write Remaining duration (NAV duration 805) to the end of the TXOP 802 in the Duration/ID field or Length field of the frame 804. The radio communication apparatus that has failed to receive the frame 801 receives the frame 804, and thus the NAV can be configured for the Remaining duration to the end of the TXOP 802. Hence, the probability of frame collision in the TXOP can be reduced. The radio communication apparatus 1-1 can write, in the frame 801, information that the radio communication apparatus 2-1 writes in the Duration/ID field or Length field of the frame 804.

The radio communication apparatus 1-1, which is the TXOP holder, can terminate (abandon) the obtained TXOP in the middle. The radio communication apparatus 1-1 can transmit a frame indicating abandonment of the obtained TXOP (frame 806). The frame 806 can be, for example, a CF-End frame. The radio communication apparatus 2-1 that has received the CF-End frame can reset the NAV configured by the apparatus itself, at the time of receiving the CF-End frame.

Note that, in a case that the frame transmitted by the radio communication apparatus 1-1 to obtain the TXOP 802 collides with a frame transmitted from another BSS, the radio communication apparatus 1-1 is not able to obtain the TXOP 802. This means that the transmission opportunity of the radio communication apparatus for which frame transmission is expected to be instructed in the TXOP 802 is also abandoned. The radio communication apparatus 1-1 according to the present embodiment can use a frame transmission wait time (e.g., PIFS), which is shorter than a normal frame transmission wait time (e.g., DIES), for a frame transmitted at the time of obtaining the TXOP 802. The radio communication apparatus 1-1 according to the present embodiment can transmit the frame transmitted at the time of obtaining the TXOP 802 without performing the random backoff process. The radio communication apparatus 1-1 according to the present embodiment can perform CCA by regarding the frame transmitted at the time of obtaining the TXOP 802 as a frame belonging to the access category with a higher priority than that for other frames.

Figure 9:
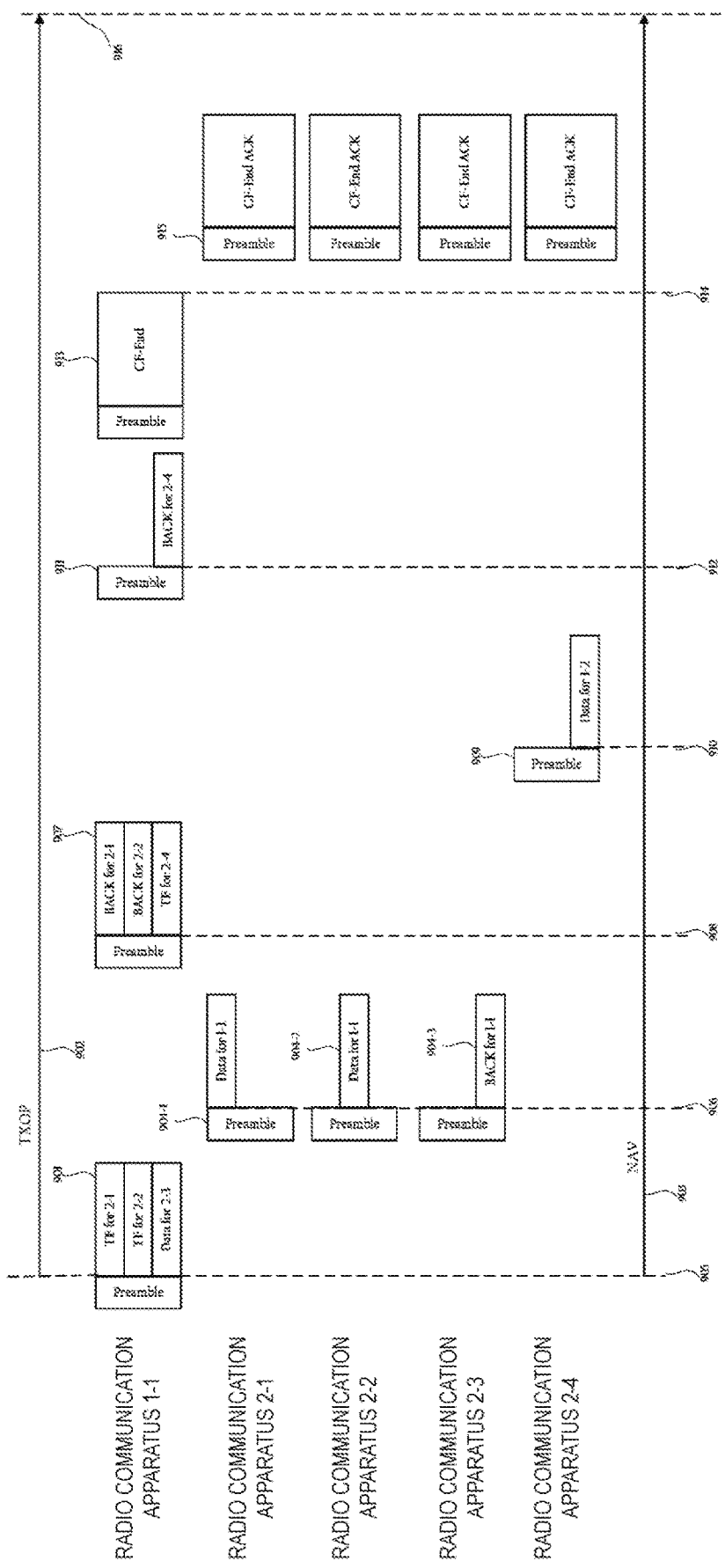
FIG. 9 is a diagram illustrating an example of the communication according to the aspect of the present invention.

FIG. 9 is a diagram illustrating an example of frame exchange between the radio communication apparatus 1-1 and the radio communication apparatus 2A according to the present embodiment. The radio communication apparatus 1-1 obtains a TXOP 902 by transmission of the frame 901, to thereby be a TXOP holder. According to the example in FIG. 9, the radio communication apparatus 1-1 includes, in the frame 901, information indicating Trigger frames for the radio communication apparatus 2-1 and the radio communication apparatus 2-2 (denoted by TF in FIG. 9) and a data frame addressed to the radio communication apparatus 2-3.

In a case of receiving the frame 901, each of the radio communication apparatuses 2-1 to 4 configures a NAV only for the duration indicated by the TXOP 902.

The radio communication apparatus 2-1 and the radio communication apparatus 2-2 for which frame transmission is instructed by the Trigger frame included in the frame 901 transmit a frame (frame 904-1 and frame 904-2, respectively) addressed to the radio communication apparatus 1-1 by using the RU indicated by the frame 901. The radio communication apparatus 2-3 that has received the data frame included in the frame 901 transmits, toward the radio communication apparatus 1-1, a block ACK frame or an ACK frame (expressed as BACK in FIG. 9) (frame 904-3) indicating whether reception of the data frame is possible.

The frames 904-1 to 3 are transmitted from the radio communication apparatuses 2-1 to 3 after the elapse of the prescribed frame transmission wait time after the reception of the frame 901 transmitted from the radio communication apparatus 1-1. In this operation, in a case that the frames 904-1 to 3 are transmitted through OFDMA transmission and MU-MIMO transmission, the numbers of LTFs included in the preambles of the frames 904-1 to 3 need to be the same.

In a case that the orthogonality among the LTFs transmitted from the radio communication apparatuses 2-1 to 3 is ensured by spread (or scrambling) using an orthogonal spreading code (e.g., Walsh code or OSVF code) in the frequency, direction, the number of LTFs can be set to match the maximum number of streams among the numbers of spatial streams transmitted from the radio communication apparatuses. For example, in a case that the number of spatial streams transmitted from the radio communication apparatus 2-1 is four and the numbers of spatial streams transmitted from the radio communication apparatuses 2-2 and 2-3 is one, each of the radio communication apparatuses 2-1 to 3 can transmit the LTFs in the four OFDM symbols in the time direction. For this transmission, the radio communication systems 2-2 and 2-3 can spread the LTFs in the time direction by using the sequence included in any one of the rows in a 4-by-4 orthogonal matrix (e.g., sequence in the first row) used by the radio communication apparatus 2-1 to transmit the LTFs in four OFDM symbols in the time direction. Note that orthogonal code sequences to be used for scrambling the LTFs in the frequency direction are assigned in advance to the radio communication apparatuses 2-1 to 3. The radio communication apparatus 1-1 can notify the radio communication apparatuses 2-1 to 3 of the assignment of the orthogonal code sequences by using Trigger frames. The assignment of the orthogonal code sequences can be associated with information indicating RU allocation of which the radio communication apparatus 1-1 notifies the radio communication apparatuses 2-1 to 3. For example, the information indicating RU allocation of which the radio communication apparatus 1-1 notifies the radio communication apparatuses 2-1 to 3 is sequentially written in the fields in the Trigger frames transmitted from the radio communication apparatus 1-1, and hence the radio communication apparatus 1-1 and the radio communication apparatuses 2-1 to 3 can associate in advance the order in which the RU allocation information is written in the fields and the prescribed order of the orthogonal code sequence.

The radio communication apparatuses 2-1 to 3 can determine the numbers of frame LTFs to transmit, based on the total number of spatial-multiplexed frames to be transmitted based on the Trigger frame included in the frame 901. For example, in a case that the number of spatial streams transmitted from the radio communication apparatus 2-1 is four and the numbers of spatial streams transmitted from the radio communication apparatuses 2-2 and 2-3 is one and that the frames transmitted from the radio communication terminals 2-1 to 3 are all transmitted by spatial multiplexing (MU-MIMO), each of the radio communication apparatuses 2-1 to 3 assumes that the total number of spatial-multiplexed frames is six and can thereby transmit the LTFs in the six OFDM symbols in the time direction. The orthogonal coding sequence used by the radio communication apparatuses 2-1 to 3 for time spread of LTFs may be notified by a Trigger frame transmitted from the radio communication apparatus 1-1, or, as in the case described before, information on the orthogonal coding sequence can be associated with information indicating RU allocation of which the radio communication apparatus 1-1 notifies the radio communication apparatuses 2-1 to 3.

The radio communication apparatuses 2-1 to 3 can write information indicating the Remaining Duration of the TXOP 902 in the frames 904-1 to 3 transmitted by the apparatuses themselves. The information indicating the Remaining Duration of the TXOP 902 written in the frames 904-1 to 3 can be common information. The information indicating the Remaining Duration of the TXOP 902 written in the frames 904-1 to 3 can be indicated by the radio communication apparatus 1-1 by being written in the frame 901.

The radio communication apparatuses 2-1 to 3 can transmit the frames 904-1 to 3 after the prescribed frame wait time, respectively.

In the TXOP 902, the radio communication apparatus 1-1 that has received the frame 904-1 to 3 can further perform frame transmission of the apparatus itself and provide an instruction of frame transmission to another radio communication apparatus. According to the example in FIG. 9, the radio communication apparatus 1-1 can transmit a block ACK frame indicating whether or not reception of the frame 904-1 and the frame 904-2 is possible to the radio communication apparatus 2-1 and the radio communication apparatus 2-2 by transmission of the frame 907. The radio communication apparatus 1-1 can transmit, to the radio communication apparatus 2-4, a Trigger frame providing an instruction of frame transmission addressed to the radio communication apparatus 1-1, by the transmission of the frame 907.

Note that the radio communication apparatus 1-1 can write, in the Duration/ID field or Length field of the frame 907, information indicating the Remaining Duration of the TXOP 902 at the time of transmitting the frame 907. The value indicating the Remaining Duration of the TXOP 902 can be the value obtained by dividing (removing) the TXOP duration written in the frame 901 by the duration that has elapsed before the radio communication apparatus 1-1 transmits the frame 907.

The radio communication apparatus 2-4 to which the Trigger frame has been transmitted by the frame 907 can transmit a frame (frame 909) addressed to the radio communication apparatus 1-1, based on the RU indicated by the frame 907. The radio communication apparatus 1-1 that has received the frame 909 can transmit, to the radio communication apparatus 2-4, a frame (frame 911) including a block ACK frame indicating whether reception of a frame addressed to the apparatus 1-1 itself included in the frame 909 is possible. Note that each of the radio communication apparatus 1-1 and the radio communication apparatus 2-4 can write, in the Duration/ID field or Length field of the frame to transmit, information indicating the Remaining Duration of the TXOP 902 at the time of transmission of the frame.

Note that, in a case that the radio communication apparatus 1-1, which is the TXOP holder, transmits a frame in the TXOP obtained by the apparatus itself, the value of the Duration/ID field or Length field written in the frame need not match information indicating the Remaining Duration of the TXOP. In a case that the value of the Duration/ID field or Length field written in the frame is shorter than the Remaining Duration of the TXOP, the radio communication apparatus 1-1 can transmit the frame after the prescribed frame transmission wait time without performing Carrier sense. In a case that the value of the Duration/ID field or Length field written in the frame is longer than the Remaining Duration of the TXOP, the radio communication apparatus 1-1 is to obtain a TXOP again. Hence, the radio communication apparatus 1-1 can transmit, after transmitting a frame indicating abandonment of the TXOP, a frame to obtain a TXOP, based on the normal CSMA/CA transmission procedure.

The radio communication apparatus 1-1 can transmit a frame (frame 913) indicating abandonment of the TXOP 902. The radio communication apparatus 1-1 can transmit a frame including a CF-End frame as the frame 913. Note that the radio communication apparatus 1-1 can transmit the CF-End frame with the destination address as a broadcast address. The radio communication apparatus 1-1 can transmit the CF-End frame individually through OFDMA transmission. In this case, the radio communication apparatus 1-1 does not necessarily transmit the CF-End frame to all the radio communication apparatuses 2A in the BSS to which the apparatus 1-1 itself belongs.

Note that the radio communication apparatus not able to receive the frame 913 is not able to recognize that the radio communication apparatus 1-1 has abandoned the TXOP 902. Hence, the radio communication apparatus 2A that has received the frame 913 can transmit a frame 915 indicating that the CF-End frame has been transmitted from the radio communication apparatus 1-1 (denoted as CF-End ACK frame in FIG. 9), after the reception of the CF-End frame. The radio communication apparatus that has received a frame indicating that the frame indicating abandonment of the TXOP 902 has been transmitted from the TXOP holder, can reset the NAV.

The TXOP 902 is already abandoned at the time point of transmission of the frame 913, and hence the radio communication apparatus 2A can transmit the frame 915, based on the normal CSMA/CA transmission procedure.

Note that, to obtain a TXOP again after the transmission of the CF-End, the radio communication apparatus 1-1 need to transmit the frame 901, based on the normal CSMA/CA transmission procedure. In this case, the radio communication apparatus 1-1 can continue performing Carrier sense while ignoring the frame that is transmitted from a radio communication apparatus belonging to the BSS of the apparatus 1-1 itself and that indicates that the CF-End frame has been transmitted from the radio communication apparatus 1-1.

In a case that the radio communication apparatus 1-1 fails to acquire any one of data frames transmitted from multiple radio communication apparatuses each of which has transmitted a Trigger frame using a frame transmitted to obtain a TXOP (frame 901 in the example of FIG. 9), the radio communication apparatus 1-1 determines that the radio communication apparatus 1-1 has failed to obtain the TXOP and can transmit a frame for abandoning the TXOP.

The radio communication apparatus that has received, with the frame 901 to start with, a frame having filled Duration/ID field and Length field configures a NAV only for the Remaining Duration of the TXOP. However, the radio communication apparatus that has failed to receive the frame indicating abandonment of the TXOP is not able to reset the NAV. Hence, in a case that the radio communication apparatus according to the present embodiment does not receive, for a prescribed duration after receiving the frame having a written Duration/ID field and Length field, any frame transmitted from the BSS to which the frame belongs, the radio communication apparatus determines that the TXOP has abandoned and can reset the NAV. Here, the prescribed duration is not particularly limited but can be defined, for example, as an integral multiple or a multiple of a real number of frame transmission wait time (SIFS, DIFS, PIFS, or AIFS) defined in the IEEE 802.11 standards.

Note that the radio communication apparatus 2A that has received the frame 901 transmitted from the radio communication apparatus 1-1, which is the TXOP holder, can transmit a frame addressed to the radio communication apparatus 1-1, based on a Trigger frame transmitted from the radio communication apparatus 1-1. However, under a prescribed condition, the radio communication apparatus 2A is not allowed to transmit any frame addressed to the radio communication apparatus 1-1 even in a case that a Trigger frame is transmitted from the radio communication apparatus 1-1. As the prescribed condition, for example, in a case that the radio communication apparatus 2A has received a RTS frame, a CTS frame, or a data frame transmitted from a radio communication apparatus belonging to another BSS (Inter BSS) and has configured a NAV, based on the information included in the RTS frame, the CTS frame, or the data frame, before receiving the frame 901 or in a case of failing to receive the frame 901, the radio communication apparatus 2A is not allowed to transmit any frame addressed to the radio communication apparatus 1-1 even in a case of receiving a Trigger frame transmitted from the radio communication apparatus 1-1 during the NAV duration.

According to the radio communication apparatus, the communication method, and the communication system described above, the radio communication apparatus that has obtained a TXOP can appropriately provide an instruction of frame transmission, to multiple radio communication apparatuses in the TXOP. Hence, the radio communication apparatus can efficiently access radio media.

2. Common to All Embodiments

A program running on the radio communication apparatus according to an aspect of the present invention is a program (a program for causing a computer to operate) that controls a CPU and the like in such a manner as to realize the functions of the above-described embodiments according to the aspect of the present invention. The information handled by these apparatuses is temporarily held in a RAM at the time of processing, and is then stored in various types of ROMs, HDDs, and the like, and read out by the CPU as necessary to be edited and written. Here, a semiconductor medium (a ROM, a non-volatile memory card, or the like, for example), an optical recording medium (DVD, MO, MD, CD, BD, or the like, for example), a magnetic recording medium (a magnetic tape, a flexible disk, or the like, for example), and the like can be given as examples of recording media for storing the programs. In addition to realizing the functions of the above-described embodiments by performing loaded programs, functions according to an aspect of the present invention can be realized by the programs running cooperatively with an operating system, other application programs, or the like in accordance with instructions included in those programs.

In a case that delivering these programs to market, the programs can be stored in a portable recording medium, or transferred to a server computer connected via a network such as the Internet. In this case, storage devices in the server computer are also included in an aspect of the present invention. Furthermore, some or all portions of each of the radio communication apparatus 1-1, the radio communication apparatus 2-1, the radio communication apparatus 1-2, and the radio communication apparatus 2-2 in the above-described embodiments may be realized as LSI, which is a typical integrated circuit. The functional blocks of the radio communication apparatus 1-1, the radio communication apparatus 2-1, the radio communication apparatus 1-2, and the radio communication apparatus 2-2 may be individually realized as chips, or may be partially or completely integrated into a chip. In a case that the functional blocks are integrated into a chip, an integrated circuit control unit for controlling them is added.

The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology.

Note that the invention of the present patent application is not limited to the above-described embodiments. The radio communication apparatus according to the invention of the present patent application is not limited to the application in the mobile station apparatus, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

The present invention is suitable to be used for a radio communication apparatus, a communication method and a Communication system.

The present international application claims priority based on JP 2016-002357 filed on Jan. 8, 2016, and all the contents of JP 2016-002357 are incorporated in the present international application by reference.

DESCRIPTION OF REFERENCE NUMERALS

1-1, 1-2, 2-1 to 8, 2A, 2B Radio communication apparatus
3-1, 3-2 Management area
10001-1 Higher layer unit
10002-1 Autonomous distributed control unit
10002a-1 CCA unit
10002b-1 Backoff unit
10002c-1 Transmission determination unit
10003-1 Transmission unit
10003a-1 Physical layer frame generation unit
10003b-1 Radio transmission unit
10004-1 Reception unit
10004a-1 Radio reception unit
10004b-1 Signal demodulation unit
10005-1 Antenna unit

The invention claimed is:

1. A radio communication apparatus configured to communicate with multiple terminal apparatuses, the radio communication apparatus comprising:
  a transmitter configured to:
  transmit a first frame to obtain a Transmission opportunity (TXOP),
  transmit a Trigger frame providing an instruction of transmission of a second frame to be transmitted to the radio communication apparatus, to at least one of the multiple terminal apparatuses in the TXOP, and
  transmit a third frame addressed to at least one of the multiple terminal apparatuses in the TXOP, wherein:
  a value indicating a TXOP that is written in the second frame and that is obtained by the third frame is different from a value indicating a Remaining Duration of a Transmission opportunity obtained by the first frame at a time of transmission of the second frame,
  a value indicating a TXOP that is written in the third frame and is obtained by the third frame is different from the value indicating the Remaining Duration of the TXOP that the first frame obtained at start of the transmission of the third frame,
  the transmitter is further configured to transmit the third frame without performing Carrier sense, in a case that the value indicating the TXOP that is written in the third frame is smaller than the value indicating the Remaining Duration of the TXOP that the first frame obtained at start of the transmission of the third frame, and
  the transmitter is further configured to transmit a frame indicating abandonment of the TXOP in a case that the value indicating the TXOP that is written in the third frame and that the third frame is to obtain is greater than a remaining duration of the TXOP that is written in the first frame at completion of transmission of the second frame; and
  a receiver configured to perform Carrier sense within a duration of the TXOP that the first frame is to obtain, in a case that the value indicating the TXOP that is written in the third frame and that the third frame is to obtain is greater than a remaining duration of the TXOP that the first frame is to obtain at completion of transmission of the second frame.

2. The radio communication apparatus according to claim 1, wherein the first frame includes information on the Trigger frame.

3. The radio communication apparatus according to claim 2, wherein the transmitter includes information indicating a TXOP that the second frame is to obtain, in the Trigger frame.

4. The radio communication apparatus according to claim 1, wherein the receiver is further configured to determine, in a case of not receiving the second frame for a prescribed duration from the transmission of the first frame from the transmitter, that the obtaining of the TXOP has failed.

5. The radio communication apparatus according to claim 4, wherein, in a case that the receiver determines that the obtaining of the TXOP has failed, the transmitter transmits the frame indicating the abandonment of the TXOP.

\* \* \* \* \*